（12）United States Patent
Takaoka

(10) Patent No.: US 8,971,553 B2
(45) Date of Patent: Mar. 3, 2015

(54) ELECTRET MATERIAL AND ELECTROSTATIC-TYPE ACOUSTIC TRANSDUCER

(75) Inventor: Seiichi Takaoka, Osaka (JP)

(73) Assignee: Nitto Denko Corporation, Osaka (JP)

( * ) Notice: Subject to any disclaimer, the term of this patent is extended or adjusted under 35 U.S.C. 154(b) by 0 days.

(21) Appl. No.: 13/131,970

(22) PCT Filed: Apr. 26, 2010

(86) PCT No.: PCT/JP2010/057394
§ 371 (c)(1),
(2), (4) Date: May 31, 2011

(87) PCT Pub. No.: WO2010/126012
PCT Pub. Date: Nov. 4, 2010

(65) Prior Publication Data
US 2011/0249834 A1    Oct. 13, 2011

(30) Foreign Application Priority Data

Apr. 27, 2009    (JP) ................. 2009-107762

(51) Int. Cl.
*H04R 25/00*    (2006.01)
(52) U.S. Cl.
USPC ......................................... 381/175; 381/191
(58) Field of Classification Search
CPC ........ H04R 25/00; H04R 19/00; H04R 19/01; H04R 19/013; H04R 19/016; H04R 17/02; H04R 1/08; H04R 9/08; H04R 11/04; H04R 21/02
USPC ............. 381/191, 173–176, 355, 369; 29/886
See application file for complete search history.

(56) References Cited

U.S. PATENT DOCUMENTS

| | | | |
|---|---|---|---|
| 3,946,422 A * | 3/1976 | Yagi et al. ..................... | 257/254 |
| 4,163,742 A | 8/1979 | Mansure | |
| 4,902,444 A | 2/1990 | Kolouch | |
| 6,726,994 B1 | 4/2004 | Araki et al. | |
| 8,277,927 B2 * | 10/2012 | Kashiwagi et al. .......... | 428/216 |
| 8,288,475 B2 * | 10/2012 | Kashiwagi ..................... | 525/104 |
| 2003/0113546 A1 | 6/2003 | Cho et al. | |

FOREIGN PATENT DOCUMENTS

| | | |
|---|---|---|
| JP | 64-044010 A | 2/1989 |
| JP | 2-129253 A | 5/1990 |
| JP | 05-142961 A | 6/1993 |
| JP | 11-150795 A | 6/1999 |

(Continued)

OTHER PUBLICATIONS

Office Action dated Jul. 31, 2012 issued by the State Intellectual Property Office of the People's Republic of China in counterpart Chinese Application No. 201080003426.2.
Office Action dated Apr. 2, 2013 issued by the State Intellectual Property Office of the People's Republic of China in counterpart Chinese Patent Application No. 201080003426.2.
Third Party Submission dated Apr. 9, 2013, in counterpart Japanese Application No. 2010-099329.

(Continued)

*Primary Examiner* — Suhan Ni
(74) *Attorney, Agent, or Firm* — Sughrue Mion, PLLC

(57) ABSTRACT

An electret material having excellent charge retentivity against heat is provided. The electret material 10 includes an electrode plate 1, a semiconducting layer 2 formed on the electrode plate 1, and an electret layer 3 formed on the semiconducting layer 2. The semiconducting layer 2 includes carbon and a fluororesin. This electret material 10 can be inhibited from decreasing in the surface potential of the electret layer 3 when heated to a high temperature.

16 Claims, 1 Drawing Sheet

(56) References Cited

FOREIGN PATENT DOCUMENTS

| | | | | | |
|---|---|---|---|---|---|
| JP | 11150795 | A | * | 6/1999 | ............. H04R 19/01 |
| JP | 11-219851 | A | | 8/1999 | |
| JP | 11-219852 | A | | 8/1999 | |
| JP | 11219851 | A | * | 8/1999 | ............. H01G 7/02 |
| JP | 2000-115895 | A | | 4/2000 | |
| JP | 2003-192914 | A | | 7/2003 | |
| JP | 2003-199197 | A | | 7/2003 | |
| JP | 2004-128361 | A | | 4/2004 | |
| JP | 2009-088100 | A | | 4/2009 | |
| JP | 2009088100 | A | * | 4/2009 | ............. H01G 7/02 |
| JP | 2009267649 | A | * | 11/2009 | ............. H04R 19/01 |
| WO | 00/29210 | A1 | | 5/2000 | |

OTHER PUBLICATIONS

International Search Report issued Jun. 22, 2010, for PCT/JP2010/057394.
Written Opinion issued Jun. 22, 2010, for PCT/JP2010/057934.
Office Action, dated Sep. 9, 2013, issued by the Japanese Patent Office in counterpart Japanese Application No. 2010-099329.
Office Action dated Jun. 24, 2014 issued by the State Intellectual Property Office of P.R. China in counterpart Chinese Application No. 201080003426.2.
Office Action mailed Jun. 3, 2014 issued by the Japanese Patent Office in counterpart Japanese Patent Application No. 2010-099329.
Office Action dated Sep. 29, 2014 issued by the State Intellectual Property Office in Chinese Patent Application No. 201080003426.2.

* cited by examiner

ELECTRET MATERIAL AND ELECTROSTATIC-TYPE ACOUSTIC TRANSDUCER

TECHNICAL FIELD

The present invention relates to an electret material and an electrostatic acoustic transducer including the same.

BACKGROUND ART

An electret material including an electrode plate and an electret layer formed thereon has conventionally been used in electrostatic acoustic transducers such as earphones, headphones, and microphones. For example, in an electret capacitor microphone (ECM) having a built-in IC (integrated circuit) element, an electret material is disposed so as to face the front-side or back-side surface of a diaphragm.

Various processes for producing such an electret material have been proposed. For example, Patent document 1 describes a process in which a thermoplastic-resin film capable of constituting an electret layer is laminated to a metal sheet and the film is converted to an electret. Patent document 2 and Patent document 3 describe a process in which a dispersion including a dispersion medium and fine particles of an FEP (specifically, a tetrafluoroethylene/hexafluoropropylene copolymer) dispersed therein is applied to a back electrode plate and heated to thereby form a thin film and this thin film is converted to an electret.

BACKGROUND ART DOCUMENT

Patent Documents

Patent Document 1: JP-A-64-44010
Patent Document 2: JP-A-11-150795
Patent Document 3: JP-A-2000-115895

SUMMARY OF THE INVENTION

Problems that the Invention is to Solve

Incidentally, there are cases where an electrostatic acoustic transducer is mounted on, for example, a control board or the like by soldering using a flow device or reflow device. However, in the case where conventional electret materials are used, there has been a problem that the mounting of the electrostatic acoustic transducer results in a decrease in the amount of electric charges possessed by the electret material. This is thought to be attributable to a decrease in the surface potential of the electret layer which is due to the heating of the electret layer to a high temperature during the soldering. As a result of the frequent use of lead-free solders especially recently, higher temperatures have come to be used for soldering, and there is hence a possibility that the amount of charges possessed by the electret material might decrease considerably.

An object of the invention is to provide, under these circumstances, an electret material having excellent charge retentivity against heat and an electrostatic acoustic transducer including the electret material.

Means for Solving the Problem

The present inventor diligently made investigations in order to overcome the problem. As a result, it has been found that an electret layer can be inhibited from decreasing in surface potential when heated at a high temperature, by forming a semiconducting layer from a carbon-containing fluororesin between an electrode plate and the electret material, although the reasons therefor are unclear. The invention has been accomplished from this standpoint.

Namely, the invention provides an electret material which includes an electrode plate; a semiconducting layer formed on the electrode plate and including carbon and a fluororesin; and an electret layer formed on the semiconducting layer.

The invention further provides an electrostatic acoustic transducer including the electret material and a diaphragm which faces the electret material.

Advantage of the Invention

According to the invention, an electret material having excellent charge retentivity against heat can be obtained.

MODE FOR CARRYING OUT THE INVENTION

Embodiments of the invention will be explained below by reference to the accompanying drawings.

Figure 1:
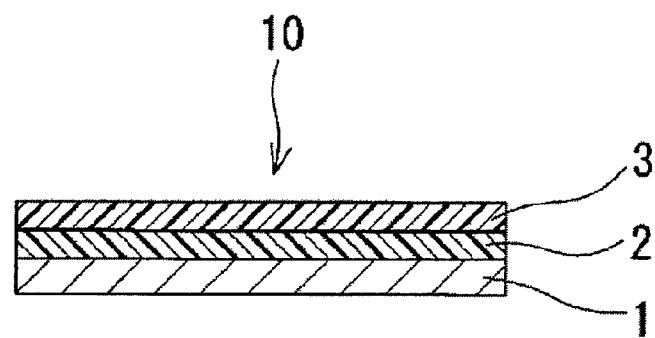
FIG. 1 is a sectional view of an electret material according to one embodiment of the invention.

An electret material 10 according to one embodiment of the invention is shown in FIG. 1. This electret material 10 includes an electrode plate 1, a semiconducting layer 2 formed on the electrode plate 1, and an electret layer 3 formed on the semiconducting layer 2.

As the electrode plate 1, metal plates made of stainless steel, aluminum, steel, copper, titanium, and alloys thereof may be used. Alternatively, the electrode plate 1 may be a metal foil supported on, for example, a substrate. Namely, the electrode plate in the invention may be any thin metallic plate, and the thickness thereof is not particularly limited. However, from the standpoint of the requirement for a reduction in the size of the electret material 10, it is preferred that the thickness of the electrode plate is 100 to 300 µm.

It is preferred that the electrode plate 1 is free from adherent fats and oils, etc. It is preferred that the electrode plate 1 is subjected to surface preparation in order to improve adhesion to the semiconducting layer 2. Although the surface preparation is not particularly limited, it is preferred to conduct a treatment which does not enhance the surface roughness of the electrode plate, such as, for example, coating film formation by either anodization or a chemical treatment, from the standpoint of attaining thickness evenness and surface smoothness of the semiconducting layer 2.

The semiconducting layer 2 includes a fluororesin which contains carbon. It is preferred that the semiconducting layer 2 has a surface resistance in the range of $1.0 \times 10^8$ to $1.0 \times 10^{15} \Omega/\square$. This is because in case where the surface resistance of the semiconducting layer 2 is less than $1.0 \times 10^8 \Omega/\square$ or exceeds $1.0 \times 10^{15} \Omega/\square$, the electret layer 3 considerably decreases in surface potential when heated to a high temperature. The surface resistance of the semiconducting layer 2 is more preferably in the range of $1.0 \times 10^8$ to $1.0 \times 10^{12} \Omega/\square$.

The thickness of the semiconducting layer 2 is not particularly limited. However, from the standpoint of the recent desire for size reduction in electrostatic acoustic transducers (e.g., microphones), the thickness of the semiconducting layer 2 is preferably 1 to 25 µm, more preferably 5 to 15 µm.

As the fluororesin contained in the semiconducting layer 2, at least one kind selected from the group consisting of tetrafluoroethylene/hexafluoropropylene copolymers (FEP), tetrafluoroethylene/perfluoroalkoxyethylene copolymers (PFA), ethylene/tetrafluoroethylene copolymers (ETFE), and polytetrafluoroethylene (PTFE) may be used.

The electret layer 3 includes PTFE, and charges are held on the surface thereof. Use of PTFE as the material constituting the electret layer 3 is more effective in inhibiting the surface potential from decreasing at high temperatures than use of other fluororesins. It is preferred that the thickness of the electret layer 3 is 10 to 50 μm. This is because so long as the thickness thereof is within that range, the electret material 10 can be reduced in thickness and size while maintaining the characteristics of the electret material 10.

Figure 2:
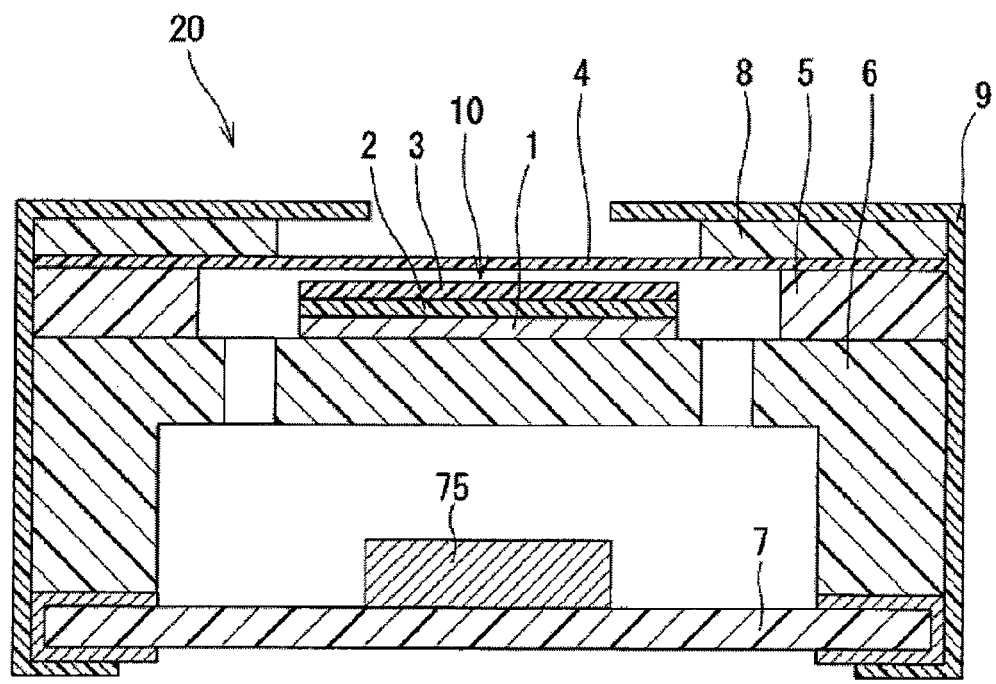
FIG. 2 is a sectional view of an electrostatic acoustic transducer employing the electret material shown in FIG. 1.

The electret material 10 shown in FIG. 1 is suitable for use in electrostatic acoustic transducers. An electrostatic acoustic transducer (ECM) 20 employing the electret material 10 is shown in FIG. 2 as an example of such electrostatic acoustic transducers. The ECM 20 shown in FIG. 2 is of the back electret type, in which the electret material 10 has been disposed so as to face the back surface of a diaphragm 4. Specifically, the ECM 20 includes a shield case 9 and the following components stacked therein in the following upward order: a circuit board 7 having an IC element 75 mounted thereon; a back electrode substrate 6 which covers the IC element 75 and supports the electret material 10; a spacer 5; the diaphragm 4; and a frame 8. The electret material 10 is supported on the back electrode substrate 6 so that the electret layer 3 faces the back surface of the diaphragm 4 in the space formed by the spacer 5.

An example of processes for producing the electret material of the invention is explained below. This process includes a semiconducting-layer formation step, a PTFE layer formation step, and a charging step.

(Semiconducting-Layer Formation Step)

In the semiconducting-layer formation step, a first dispersion including a dispersion medium and fine fluororesin particles dispersed therein and a second dispersion including a solvent and fine carbon particles dispersed therein are first mixed with each other to prepare a liquid mixture. The mixing of the first dispersion with the second dispersion is conducted so that the amount of the solid matter in the second dispersion is, for example, 4 to 10 parts by weight, preferably 5 to 9 parts by weight, per 100 parts by weight of the solid matter in the first dispersion.

As the first dispersion, for example, a commercial FEP dispersion or PFA dispersion may be used. Examples of the FEP dispersion include Neoflon ND-4, manufactured by Daikin Industries, Ltd., and examples of the PFA dispersion include Neoflon AD-2CRE, manufactured by Daikin Industries, Ltd.

As the second dispersion, for example, a commercial carbon paste (aqueous dispersion of conductive carbon) may be used. For example, Lion Paste W-310A, manufactured by Lion Corp., may be used.

Thereafter, distilled water is added to the liquid mixture to thereby adjust the specific gravity of the liquid mixture to, for example, 1.2 to 1.4.

After the specific gravity has been adjusted, the liquid mixture is applied to an electrode plate. For applying the liquid mixture to an electrode plate, a known technique can be used. For example, the liquid mixture may be applied using a dispenser, or may be applied by spin coating or a printing technique. Alternatively, a method in which one surface of the electrode plate is masked and this electrode plate is immersed (dipped) in the liquid mixture to thereby apply the liquid mixture to the electrode plate may be used.

After the liquid mixture has been applied to the electrode plate, the liquid mixture is dried in order to remove the dispersion medium from the liquid mixture. The drying is conducted, for example, by placing the mixture-coated electrode plate in an environment having a temperature (e.g., 180° C.) lower than the melting point of the fluororesin for a given time period (e.g., 10 minutes).

Thereafter, the fine fluororesin particles are sintered. The sintering is conducted, for example, by a method in which the electrode plate on which the dried liquid mixture (fine fluororesin particles and fine carbon particles) is supported is placed in an environment having a temperature (e.g., 360° C.) not lower than the melting point of the fluororesin for a given time period (e.g., 10 minutes). Thus, a semiconducting layer made of a carbon-containing fluororesin is formed on the electrode plate. After the sintering, the whole resultant multilayer structure is cooled to room temperature.

(PTFE Layer Formation Step)

In the PTFE layer formation step, a third dispersion including a dispersion medium and fine PTFE particles dispersed therein is prepared first. The specific gravity of this third dispersion is adjusted to, for example, 1.4 to 1.5 with distilled water. Various commercial products of such a dispersion which were produced by emulsion polymerization are on the market, and these commercial products can be utilized as the third dispersion. For example, Polyflon D-1, manufactured by Daikin Industries, Ltd., Fluon AD911L, manufactured by Asahi Glass Co., Ltd., or the like may be used.

After the specific gravity thereof has been adjusted, the third dispersion is applied to the semiconducting-layer-side surface of the multilayer structure including the semiconducting layer and the electrode plate. Namely, the third dispersion is applied on the semiconducting layer. For applying the third dispersion on the semiconducting layer, the same techniques as for the liquid mixture described above can be used.

After the third dispersion has been applied on the semiconducting layer, the third dispersion is dried in order to remove the dispersion medium from the third dispersion. The drying is conducted, for example, by a method in which the multilayer structure to which the third dispersion has been applied is placed in an environment having a temperature (e.g., 180° C.) lower than the melting point of the PTFE for a given time period (e.g., 10 minutes).

Thereafter, the fine PTFE particles are sintered. The sintering is conducted, for example, by a method in which the multilayer structure on which the dried third dispersion (fine PTFE particles) is supported is placed in an environment having a temperature (e.g., 360° C.) not lower than the melting point of the PTFE for a given time period (e.g., 10 minutes). Thus, a PTFE layer is formed on the semiconducting layer. After the sintering, the whole multilayer structure is cooled to room temperature.

Incidentally, for forming a PTFE layer on the semiconducting layer, a method in which a PTFE film is press-bonded with heating to the semiconducting-layer-side surface of the multilayer structure using a hot press may be used.

(Charging Step)

In the charging step, the surface of the PTFE layer is subjected to a charging treatment to convert the PTFE layer into an electret layer. The charging treatment is conducted by polarizing and charging the surface of the PTFE layer by, for example, a corona discharge or the like.

In the case of mass-production, a plurality of electret materials may be produced by a method in which the steps up to the PTFE layer formation step are conducted inclusively for the multiple electret materials and the PTFE-coated electrode plate is cut into the size of individual pieces before the charging step. Furthermore, aging may be conducted after the charging step.

Through the steps described above, an electret material having excellent charge retentivity against heat can be obtained.

EXAMPLES

The invention will be explained below in detail by reference to Examples, but the invention should not be construed as being limited to the following Examples in any way.

Example 1

A commercial FEP dispersion (Neoflon ND-4, manufactured by Daikin Industries, Ltd. (solid concentration, 40 wt %)) was mixed with a commercial carbon paste (Lion Paste W-310A, manufactured by Lion Corp. (solid concentration, 17.5 wt %)) so that the amount of the solid matter in the carbon paste was 8 parts by weight per 100 parts by weight of the solid matter contained in the FEP dispersion. Thereafter, the resultant mixture was stirred to prepare a liquid mixture. Subsequently, the specific gravity of the liquid mixture was adjusted to 1.30 with distilled water.

A commercial aluminum foil having a thickness of 200 μm (manufactured by Toyo Aluminium K.K.; flexible foil with roughened surface) was used as an electrode plate, and one surface of this electrode plate was masked with a pressure-sensitive adhesive masking tape. This electrode plate was passed through the liquid mixture prepared above, at a dipping rate of 200 mm/min to apply the liquid mixture to the other surface of the electrode plate. Subsequently, the electrode plate was placed in a 180° C. environment for 10 minutes to dry the liquid mixture, and the pressure-sensitive adhesive masking tape was then removed. Thereafter, the electrode plate was placed in a 360° C. environment for 10 minutes to sinter the fine FEP particles. Thus, a semiconducting layer which had a thickness of 15 μm and was made of a carbon-containing FEP was formed on the electrode plate having a thickness of 200 μm. After the sintering, the whole resultant multilayer structure was cooled to room temperature.

Subsequently, distilled water was added to a commercial PTFE dispersion (Fluon AD911L, manufactured by Asahi Glass Co., Ltd. (solid concentration, 60 wt %)) to adjust the specific gravity thereof to 1.50. Next, the electrode-plate-side surface of the multilayer structure composed of the semiconducting layer and the electrode plate was masked with a pressure-sensitive adhesive masking tape. This multilayer structure was passed through the PTFE dispersion at a dipping rate of 100 min/min to apply the PTFE dispersion to the semiconducting layer. Subsequently, the multilayer structure was placed in a 180° C. environment for 10 minutes to dry the PTFE dispersion, and the pressure-sensitive adhesive masking tape was then removed. Thereafter, the multilayer structure was placed in a 360° C. environment for 10 minutes to sinter the fine PTFE particles. Thus, a PTFE layer having a thickness of 25 μm was formed on the semiconducting layer. After the sintering, the whole multilayer structure was cooled to room temperature.

Finally, the surface of the PTFE layer was polarized and charged at 25° C. by a minus corona discharge to thereby convert the PTFE layer to an electret layer. Thus, an electret material was obtained.

Example 2

An electret material was obtained in the same manner as in Example 1, except that the specific gravity of the PTFE dispersion to be applied to the semiconducting layer was adjusted to 1.40 and a PTFE layer having a thickness of 15 μm was formed.

Example 3

An electret material was obtained in the same manner as in Example 1, except that the FEP dispersion was mixed with the carbon paste so that the amount of the solid matter in the carbon paste was 6 parts by weight per 100 parts by weight of the solid matter contained in the FEP dispersion.

Example 4

A commercial PFA dispersion (Neoflon AD-2CRE, manufactured by Daikin Industries, Ltd. (solid concentration, 40 wt %)) was mixed with a commercial carbon paste (Lion Paste W-310A, manufactured by Lion Corp. (solid concentration, 17.5 wt %)) so that the amount of the solid matter in the carbon paste was 8 parts by weight per 100 parts by weight of the solid matter contained in the PFA dispersion. Thereafter, the resultant mixture was stirred to prepare a liquid mixture. Subsequently, the specific gravity of the liquid mixture was adjusted to 1.30 with distilled water.

A commercial aluminum foil having a thickness of 200 μm (manufactured by Toyo Aluminium K.K.; flexible foil with roughened surface) was used as an electrode plate, and one surface of this electrode plate was masked with a pressure-sensitive adhesive masking tape. This electrode plate was passed through the liquid mixture prepared above, at a dipping rate of 200 mm/min to apply the liquid mixture to the other surface of the electrode plate. Subsequently, the electrode plate was placed in a 180° C. environment for 10 minutes to dry the liquid mixture, and the pressure-sensitive adhesive masking tape was then removed. Thereafter, the electrode plate was placed in a 360° C. environment for 10 minutes to sinter the fine PFA particles. Thus, a semiconducting layer which had a thickness of 15 μm and was made of a carbon-containing PFA was formed on the electrode plate having a thickness of 200 μm. After the sintering, the whole resultant multilayer structure was cooled to room temperature.

Subsequently, using a hot press, a commercial PTFE film having a thickness of 25 μm (No. 900-UL, manufactured by Nitto Denko Corp.) was press-bonded with heating (temperature, 360° C.; pressure, 490 kPa) to the semiconducting-layer-side surface of the multilayer structure composed of the semiconducting layer and the electrode plate. Thus, a PTFE layer having a thickness of 25 μm was formed on the semiconducting layer.

Finally, the surface of the PTFE layer was polarized and charged at 25° C. by means of a minus corona discharge to thereby convert the PTFE layer to an electret layer. Thus, an electret material was obtained.

Example 5

A multilayer structure composed of a semiconducting layer and an electrode plate was produced in the same manner as in Example 1. Thereafter, using a hot press, a commercial PTFE film having a thickness of 50 μm (No. 900-UL, manufactured by Nitto Denko Corp.) was press-bonded with heating (temperature, 360° C.; pressure, 490 kPa) to the semiconducting-layer-side surface of the multilayer structure. Thus, a PTFE layer having a thickness of 50 μm was formed on the semiconducting layer.

Finally, the surface of the PTFE layer was polarized and charged at 25° C. by a minus corona discharge to thereby convert the PTFE layer to an electret layer. Thus, an electret material was obtained.

Example 6

An electret material was obtained in the same manner as in Example 1, except that the FEP dispersion was mixed with the carbon paste so that the amount of the solid matter in the carbon paste was 10 parts by weight per 100 parts by weight of the solid matter contained in the FEP dispersion.

Example 7

An electret material was obtained in the same manner as in Example 1, except that the FEP dispersion was mixed with the carbon paste so that the amount of the solid matter in the carbon paste was 4 parts by weight per 100 parts by weight of the solid matter contained in the FEP dispersion.

Comparative Example 1

Distilled water was added to a commercial PTFE dispersion (Fluon AD911L, manufactured by Asahi Glass Co., Ltd. (solid concentration, 60 wt %)) to adjust the specific gravity thereof to 1.50. A commercial aluminum foil having a thickness of 200 μm (manufactured by Toyo Aluminium K.K.; flexible foil with roughened surface) was used as an electrode plate, and one surface of this electrode plate was masked with a pressure-sensitive adhesive masking tape. This electrode plate was passed through the PTFE dispersion at a dipping rate of 100 mm/min to apply the PTFE dispersion to the other surface of the electrode plate. Subsequently, the electrode plate was placed in a 180° C. environment for 10 minutes to dry the PTFE dispersion, and the pressure-sensitive adhesive masking tape was then removed. Thereafter, the electrode plate was placed in a 360° C. environment for 10 minutes to sinter the fine PTFE particles. After the sintering, the whole resultant multilayer structure was cooled to room temperature. Thus, a PTFE layer having a thickness of 25 μm was formed on the electrode plate having a thickness of 200 μm.

Finally, the surface of the PTFE layer was polarized and charged at 25° C. by a minus corona discharge to thereby obtain an electret material.

Comparative Example 2

A commercial PTFE film having a thickness of 25 μm (No. 900-UL, manufactured by Nitto Denko Corp.) was press-bonded with heating to a commercial aluminum foil having a thickness of 200 μm (manufactured by Toyo Aluminium K.K.; flexible foil with roughened surface) using a hot press (temperature, 360° C.; pressure, 490 kPa). Thereafter, the surface of the PTFE film was polarized and charged at 25° C. by a minus corona discharge to thereby obtain an electret material.

Comparative Example 3

Distilled water was added to a commercial FEP dispersion (Neoflon ND-4, manufactured by Daikin Industries, Ltd. (solid concentration, 40 wt %) to adjust the specific gravity thereof to 1.30. A commercial aluminum foil having a thickness of 200 μm (manufactured by Toyo Aluminium K.K.; flexible foil with roughened surface) was used as an electrode plate, and one surface of this electrode plate was masked with a pressure-sensitive adhesive masking tape. This electrode plate was passed through the FEP dispersion at a dipping rate of 200 mm/min to apply the FEP dispersion to the other surface of the electrode plate. Subsequently, the electrode plate was placed in a 180° C. environment for 10 minutes to dry the FEP dispersion, and the pressure-sensitive adhesive masking tape was then removed. Thereafter, the electrode plate was placed in a 360° C. environment for 10 minutes to sinter the fine FEP particles. Thus, an FEP layer having a thickness of 15 μm was formed on the electrode plate having a thickness of 200 μm. After the sintering, the whole resultant multilayer structure was cooled to room temperature.

Subsequently, distilled water was added to a commercial PTFE dispersion (Fluon AD911L, manufactured by Asahi Glass Co., Ltd. (solid concentration, 60 wt %)) to adjust the specific gravity thereof to 1.50. Next, the electrode-plate-side surface of the multilayer structure composed of the FEP layer and the electrode plate was masked with a pressure-sensitive adhesive masking tape. This multilayer structure was passed through the PTFE dispersion at a dipping rate of 100 mm/min to apply the PTFE dispersion to the FEP layer. Subsequently, the multilayer structure was placed in a 180° C. environment for 10 minutes to dry the PTFE dispersion, and the pressure-sensitive adhesive masking tape was then removed. Thereafter, the multilayer structure was placed in a 360° C. environment for 10 minutes to sinter the fine PTFE particles. Thus, a PTFE layer having a thickness of 25 μm was formed on the FEP layer. After the sintering, the whole multilayer structure was cooled to room temperature.

Finally, the surface of the PTFE layer was polarized and charged at 25° C. by a minus corona discharge to thereby obtain an electret material.

(Test)

After the formation of the semiconducting layer in the course of the production of each of the electret materials of Examples 1 to 7, the surface resistance of the semiconducting layer was measured with Hiresta (Type MCP-HT450), manufactured by Mitsubishi Chemical Corp.

Furthermore, all the electret materials of the Examples and Comparative Examples were examined for the retention of electret-layer surface potential in the following manner.

First, the surface potential of the electret layer immediately after the charging treatment was measured with a surface potential meter (Model 244, manufactured by MONROE ELECTRONICS, Inc.). Subsequently, the electret material was placed in a 210° C. environment for 30 minutes (loading test), and the surface potential of the electret material was thereafter measured in the same manner. This operation was repeated three times. The proportion of the surface potential measured after each of the first to the third loading tests to the surface potential of the electret material measured immediately after the charging treatment as a reference (100%) was calculated as a retention of surface potential (%).

The results of the tests are shown in Table 1.

TABLE 1

|  | Surface resistance of semi-conducting layer | Retention of surface potential after loading test (%) | | |
|---|---|---|---|---|
|  | ($\Omega/\square$) | First | Second | Third |
| Example 1 | $3.3 \times 10^9$ | 85 | 78 | 78 |
| Example 2 | $5.2 \times 10^9$ | 72 | 67 | 66 |
| Example 3 | $2.0 \times 10^{13}$ | 76 | 71 | 69 |
| Example 4 | $8.3 \times 10^8$ | 82 | 74 | 73 |
| Example 5 | $5.6 \times 10^9$ | 93 | 82 | 80 |
| Example 6 | $6.3 \times 10^6$ | 32 | 25 | 25 |
| Example 7 | $7.2 \times 10^{15}$ | 35 | 26 | 23 |
| Comparative Example 1 | — | 17 | 11 | 12 |
| Comparative Example 2 | — | 24 | 16 | 14 |
| Comparative Example 3 | — | 9 | 1 | 1 |

As apparent also from Table 1, the electret materials of Comparative Examples 1 to 3, which each had no semiconducting layer between the electret layer and the electrode plate, had a retention of surface potential that had decreased already to below 30% after the first loading test. In contrast, the electret materials of Examples 1 to 7, which each had a semiconducting layer between the electret layer and the electrode plate, had a retention of surface potential higher than 30% after the first loading test. It can be seen that the electret materials of the Examples were inhibited from decreasing in the surface potential of the electret layer when heated at high temperatures.

Incidentally, the electret material of Example 6, in which the semiconducting layer had a surface resistance lower than $1.0 \times 10^8 \Omega/\square$, and the electret material of Example 7, in which the semiconducting layer had a surface resistance higher than $1.0 \times 10^{15} \Omega/\square$, disadvantageously had a retention of surface potential lower than 40% after the first loading test. However, the electret materials of Examples 1 to 5, in each of which the semiconducting layer had a surface resistance in the range of $1.0 \times 10^8 \Omega/\square$ to $1.0 \times 10^{15} \Omega/\square$, retained an exceedingly high retention of surface potential even after the third loading test.

This application is based on a Japanese patent application filed on Apr. 27, 2009 (Application No. 2009-107762), the contents thereof being incorporated herein by reference.

INDUSTRIAL APPLICABILITY

The electret material of the invention is suitable for use in electrostatic acoustic transducers. The electrostatic acoustic transducers include hearing aids, ultrasonic sensors, acceleration sensors, and the like besides microphones, earphones, and headphones.

DESCRIPTION OF REFERENCE NUMERALS

1 Electrode plate
2 Semiconductor layer
3 Electret layer
4 Diaphragm
5 Spacer
6 Back electrode substrate
7 Circuit board
8 Frame
9 Shield case
10 Electret material
20 ECM (electrostatic acoustic transducer)
75 IC element

The invention claimed is:

1. An electret material comprising:
    an electrode plate;
    a semiconducting layer formed on the electrode plate and comprising carbon and a fluororesin; and
    an electret layer formed on the semiconducting layer,
    wherein the semiconducting layer has a surface resistance in the range of $1.0 \times 10^8$ to $1.0 \times 10^{15} \Omega/\square$.

2. The electret material according to claim 1, wherein the semiconducting layer has a surface resistance in the range of $1.0 \times 10^8$ to $1.0 \times 10^{12} \Omega/\square$.

3. The electret material according to claim 1, wherein the semiconducting layer has a thickness of 1 to 25 μm.

4. The electret material according to claim 1, wherein the fluororesin comprises at least one kind selected from the group consisting of tetrafluoroethylene/hexafluoropropylene copolymers, tetrafluoroethylene/perfluoroalkoxyethylene copolymers, ethylene/tetrafluoroethylene copolymers and polytetrafluoroethylene.

5. The electret material according to claim 1, wherein the electret layer comprises polytetrafluoroethylene.

6. The electret material according to claim 1, wherein the electret layer has a thickness of 10 to 50 μm.

7. The electret material according to claim 1, wherein the fluororesin is selected from the group consisting of tetrafluoroethylene/hexafluoropropylene copolymer, ethylene/tetrafluoroethylene copolymer and polytetrafluoroethylene.

8. The electret material according to claim 7, wherein the electret layer comprises polytetrafluoroethylene.

9. The electret material according to claim 8, wherein the thickness of the electrode plate is from 100 to 300 μm, the thickness of the semiconductor layer is from 1-25 μm, and the thickness of the electret layer is from 10-50 μm.

10. The electret material according to claim 1, wherein the electret layer comprises polytetrafluoroethylene and the fluororesin is tetrafluoroethylene/hexafluoropropylene copolymer.

11. An electret material comprising:
    an electrode plate;
    a semiconductor layer formed on the electrode plate; and
    an electret layer formed on the semiconducting layer,
    wherein a material of the semiconducting layer comprises carbon and a fluororesin, and the material is a semiconductor, and
    the fluororesin is selected from the group consisting of polytetrafluoroethylene, tetrafluoroethylene/hexafluoropropylene copolymer, and ethylene/tetrafluoroethylene copolymer.

12. The electret material according to claim 11, wherein the semiconducting layer has a surface resistance in the range of $1.0 \times 10^8$ to $1.0 \times 10^{15} \Omega/\square$.

13. The electret material according to claim 11, wherein the semiconducting layer has a surface resistance in the range of $1.0 \times 10^8$ to $1.0 \times 10^{12} \Omega/\square$.

14. The electret material according to claim 11, wherein the thickness of the electrode plate is from 100 to 300 μm, the thickness of the semiconductor layer is from 1-25 μm, and the thickness of the electret layer is from 10-50 μm.

15. The electret material according to claim 11, wherein the fluororesin is tetrafluoroethylene/hexafluoropropylene copolymer.

16. An electrostatic transducer, comprising:
an electret material comprising:
- an electrode plate;
- a semiconducting layer formed on the electrode plate and comprising carbon and a fluororesin; and
- an electret layer formed on the semiconducting layer,
- wherein the semiconducting layer has a surface resistance in the range of $1.0 \times 10^8$ to $1.0 \times 10^{15} \Omega/\square$, and a diaphragm which faces the electret material.

\* \* \* \* \*